United States Patent [19]
Lambros et al.

[11] Patent Number: 5,321,345
[45] Date of Patent: Jun. 14, 1994

[54] MOISTURE ACTIVATED SENSOR SYSTEM

[76] Inventors: George Lambros, 1250 Lee Rd., Northbrook, Ill. 60062; George P. Nassos, 1412 Elizabeth La., Glenview, Ill. 60025

[21] Appl. No.: 989,158

[22] Filed: Dec. 11, 1992

[51] Int. Cl.$^5$ .................................................. G08B 5/22
[52] U.S. Cl. ..................................... 318/483; 340/602; 340/901; 340/425.5; 307/10.1
[58] Field of Search ............... 318/112, 264, 265, 266, 318/267, 268, 269, 286, 466, 467, 468, 469, 470, 483; 340/901, 425.5, 540, 601, 602; 307/9.1, 10.1

[56] References Cited

U.S. PATENT DOCUMENTS

| | | | |
|---|---|---|---|
| 2,640,958 | 6/1953 | Davis | 318/470 |
| 2,754,460 | 7/1956 | Goldman | 318/102 |
| 3,386,022 | 5/1968 | Redmond | 318/483 |
| 4,852,469 | 8/1989 | Chuang | 318/266 X |
| 4,908,554 | 3/1990 | Chance | 318/483 |

*Primary Examiner*—Bentsu Ro

[57] ABSTRACT

A moisture-sensing device for automatically closing motor vehicle external openings such as convertible tops, sun or moon roofs, or windows; a moisture sensor for providing a signal by as little as a single drop of water; a device providing for closing any combination of external openings simultaneously (or sequentially); a device providing for the closing of a sun or moon roof that possesses a safety feature requiring two separate closure steps; a device providing for a signal to a handheld beeper to alert a person to close a manually operated vehicle opening.

7 Claims, 3 Drawing Sheets

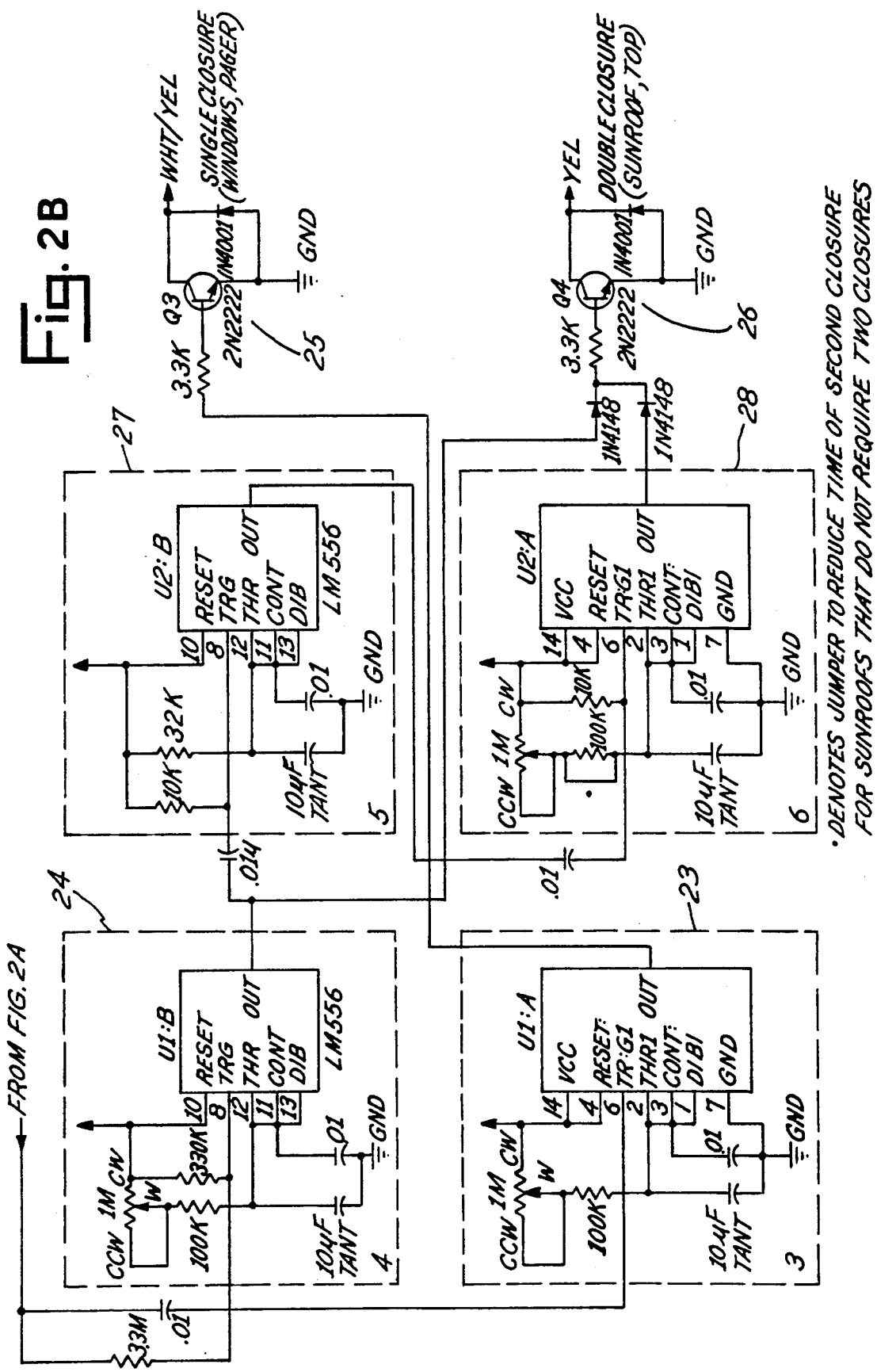

MOISTURE ACTIVATED SENSOR SYSTEM

BACKGROUND OF THE INVENTION

1. Field of the Invention

This invention relates to a device which is responsive to moisture such as rain, sleet and snow, and will automatically close motor vehicles' (automobiles, vans, etc.) external openings such as convertible tops, moon or sun roofs, or windows, and particularly to close these openings immediately after the commencement of precipitation.

2. Background of the Art

Various systems that are responsive to moisture for automatically closing external openings such as convertible tops, moon or sun roofs, windows, etc. to protect the automobile interior are known. These systems generally consist of a moisture-sensitive device located outside the automobile in such a manner to detect precipitation on the motor vehicle. This device produces a signal which activates an electrical switch which in turn causes motorized mechanisms to close the external openings.

One such system typical of the prior art is disclosed in U.S. Pat. No. 4,908,554 and U.S. Pat. No. 4,810,944. That system has the capability of sensing an obstruction, terminating the signal for a predetermined time and reinstating the signal in another attempt to close the opening. This process is repeated a limited number of times in an attempt to effectuate the closure. This system employs a moisture sensing device that will provide a signal only after sensing moisture in excess of a predetermined threshold. The amount of moisture necessary to activate this system may be such that the interior of the vehicle will become wet before the external openings are closed.

Another such system is disclosed in U.S. Pat. No. 3,307,095. In that system, the moisture sensing device is located between the opening of the hood and the body in front of the windshield. With such a small opening, the sensing device must also be very small, thus decreasing the probability that precipitation will activate the system before the vehicle interior becomes wet.

Still another such system is disclosed in U.S. Pat. No. 2,994,525. In that system, a signal from a moisture sensor actuates a series of relays which cause a motor to rotate a drive-shaft which carries a plurality of cams. The cams of the rotating shaft sequentially actuate individual window motors. During a sudden burst of precipitation, the vehicle interior may become wet while the system closes one opening at a time.

Still yet another such system is disclosed in U.S. Pat. No. 2,823,346. That system closes all openings in response to the detection of rain, but reopens such openings when rain is no longer detected unless the doors of the motor vehicle have been previously locked. Repeated short showers, causing the system to close and open the vehicle openings repeatedly, will cause a drain on the vehicle's electrical system to a level that may prevent the use of the electrical system for starting the vehicle motor. The moisture sensing device in this system consists of electrical wire wrapped around a torpedo-shaped hood ornament, a device both inefficient and impractical.

Yet another such system is disclosed in U.S. Pat. No. 2,802,694. That system employs a moisture sensing device that can be activated with a single drop of water. However, the contact point is an elongated slit between two plates forming a V-shaped trough. For maximum sensitivity, the spacing between the two plates should be between forty thousandths and one hundred and twenty five thousandths inch. The theory is that any drop of rain water making contact with the V-shaped plates will fall to the bottom of the moisture sensing device and make contact with the elongated slit. Unless the plates are highly polished or at a steep angle, the rain drops may not necessarily make immediate contact with the elongated slit at the bottom of the moisture sensing device.

None of the systems of the prior art provides for the immediate closure of the vehicle external openings, and employ a moisture-sensing device that has high probability of activating the closure system immediately after precipitation falls on the motor vehicle. If the moisture sensing device requires a predetermined accumulation of water to activate the closure, or if the moisture sensing device has such a small cross-sectional area that the probability of precipitation making proper contact immediately after the commencement of precipitation is relatively small, the vehicle openings may not close immediately and thus permitting rain water to enter the interior of the vehicle and possibly cause water damage. If the moisture sensing device does activate the closure system immediately but the openings are closed on a sequential basis, it will require a minimum period of time before all the vehicle openings are closed, and thus rain water most likely will enter the interior of the vehicle and possibly cause water damage.

Also, none of the systems of the prior art accommodates the possibility of a motor vehicle having openings such as window, sun or moon roofs, or convertible tops that are not electrically operated but rather must be closed or opened manually. While most of the new automobiles are equipped with motorized openings, there are some new automobiles that offer only manually operated openings, particularly convertible tops. For older automobiles, manually operated openings are more prevalent.

Some of the automobile manufacturers have incorporated a safety feature in the operation of the motorized sun or moon roofs, whereby when the closure switch is depressed, the roof will only close approximately half way. The closure switch must then be released and depressed again in order to close the roof completely. This safety feature prevents the accidental and complete closure of the sun or moon roof. None of the systems of the prior art have the capability of automatically and completely closing such a sun or moon roof upon the activation of the system by the presence of moisture.

Accordingly, it is an object of the present invention to provide a rain-activated sensor system which can easily be installed in motor vehicles, such as automobiles, during the assembly of the motor vehicle or after the motor vehicle has been completed, whether it has been previously driven or not.

Another object of the present invention is to sense the presence of moisture, such as rain water, snow, sleet, etc.

Still another object of the present invention is to sense the presence of moisture immediately after the moisture has made contact with the motor vehicle surface.

A further object of the present invention is to provide a means for automatically closing motor vehicle external openings, such as windows, sun or moon roofs, or convertible tops, upon the detection of moisture.

Yet a further object of the present invention is to provide a means for automatically closing all or any combination of the vehicles's external openings upon the sensing of moisture.

Yet another object of the present invention is to provide a means for automatically closing all or any combination of the vehicle's external openings simultaneously upon the sensing of moisture.

Still yet another object of the present invention is to provide a means for automatically closing, upon the sensing of moisture, an external opening, such as a sun or moon roof, that possesses a safety feature requiring two separate closure steps.

Another object of the present invention is to provide a rain-activated sensor system for motor vehicles that will not operate when the motor vehicle's ignition is on.

A further object of the present invention is to provide a rain-activated sensor system for motor vehicles that will automatically close external openings upon the sensing of moisture, but will not attempt to repeat the process if the moisture is no longer present and reappears, unless the ignition of the motor vehicle has been turned on and then off again.

Another object of the present invention is to provide a rain-activated sensor system for motor vehicles that will automatically close external openings upon the sensing of moisture, but will not send power to such openings if the openings are already closed.

Still yet another object of the present invention is to provide a rain-activated sensor system that will control the period of time necessary to close each external opening without directing any excess power to that external opening.

Yet another object of the present invention is to provide a rain-activated sensor system that will in turn provide a means to close a vehicle's external openings that can only be opened or closed manually.

Other objects and advantages of this invention will become apparent hereinafter.

SUMMARY OF THE INVENTION

The system of the present invention senses moisture and causes the closure of external openings of motor vehicles. This system senses moisture immediately after the precipitation touches a predetermined surface of the vehicle and immediately closes external openings such as convertible tops, sun or moon roofs, or windows. This provides a system that minimizes the amount of time necessary to close the external openings, and thus minimizing the possible water damage to the vehicle interior. Additionally, the present invention will close sun or moon roofs that are equipped with a safety feature that requires a two-step closure process. Also, this system can send a signal to devices, such as an alarm, a flashing light, or a hand-held beeper, which will notify a person that the manually operated external openings must be closed.

Therefore, an aspect of the present invention is to provide a moisture-sensitive system for closing external openings of motor vehicles immediately after any precipitation comes in contact with the vehicle surface.

Another aspect of the present invention is to provide a system that will close any one, any combination, or all external openings, such as convertible tops, sun or moon roofs, or windows, simultaneously.

Yet another aspect of the present invention is to provide a means for automatically closing, upon the sensing of moisture, an external opening, such as a sun or moon roof, that possesses a safety feature requiring two separate closure steps.

Still another aspect of the present invention is to provide moisture-sensitive system for the closure of external openings, but will not operate when the motor vehicle's ignition is on.

A further aspect of the present invention is to provide a moisture-sensitive system that will automatically close external openings upon the sensing of moisture, but will not attempt to repeat the process if the moisture is no longer present and reappears, unless the ignition of the motor vehicle has been turned on and then off again.

Yet still another aspect of the present invention is to provide a moisture-sensitive system that will automatically close external openings upon the sensing of moisture, but will not send power to such openings if the openings are already closed.

Another aspect of the present invention is to provide a means for closing a vehicle's external openings, that can only be opened or closed manually, by appropriately alerting a person of that need.

BRIEF DESCRIPTION OF THE DRAWINGS

These and other aspects of the invention will become more apparent to those skilled in the art from the following disclosure and accompanying figures wherein:

FIG. 2A and FIG. 2B show a schematic diagram of a circuit embodying the present invention.

DESCRIPTION OF THE PREFERRED EMBODIMENTS

Figure 1:
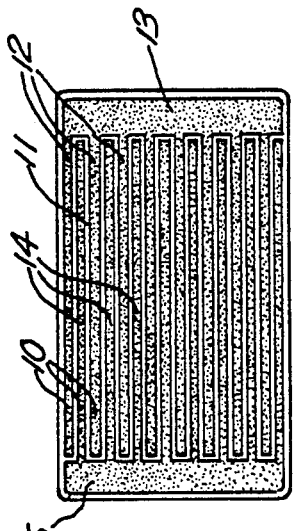
FIG. 1 is a top view of a moisture sensor which can be utilized in practicing the present invention.

Referring to FIG. 1, this is a drawing of a sensor that may be used to detect the presence of moisture such as rain, sleet or snow. It consists of a number of parallel conductive strips 10, the width of which can be from two hundredths inch to twenty five hundredths inch. The effectiveness of the sensor increases with decreasing width of the conductive strips. The distance 11 between two successive conductive strips, that is the non-conductive area of the sensor, can be between one hundredth inch to twelve hundredths inch. The sensitivity, and thus the effectiveness, of the sensor increases with decreasing distance between the conductive strips. All odd numbered 12 conductive strips are connected together by another conductive strip 13 located at one end of the sensor and perpendicular to the parallel strips. This perpendicular strip is usually of the same width but does not necessarily need to be of the same width. All the even numbered 14 conductive strips are connected together by a different conductive strip 15 located at the other end of the sensor and perpendicular to the parallel strips.

When a drop of water, known in the art to be electrically conductive, falls on the sensor, it will make contact with two adjacent conductive strips. This will act as a switch and close this circuit, thus sending an electrical signal to the level detection comparator, 30 in FIG. 3. The probability of the first drop of water making contact with adjacent conductive strips and thus sending a signal to the level detection comparator increases with decreasing distance between the adjacent conductive strips. Also important to the effectiveness of the moisture sensor in FIG. 1 is the overall size of the sensor. The size of the moisture sensor is not critical to practicing the present invention since it can be as large as the roof of a motor vehicle or as small as the dimensions of one drop of water. The recommended size of the moisture sensor is determined by practicality, large enough to catch a falling rain drop as soon as it starts to rain, yet small enough to be aesthetically acceptable on a motor vehicle. A recommended size to meet this criteria is for the moisture sensor to cover an area between three and six square inches.

Figure 2A:
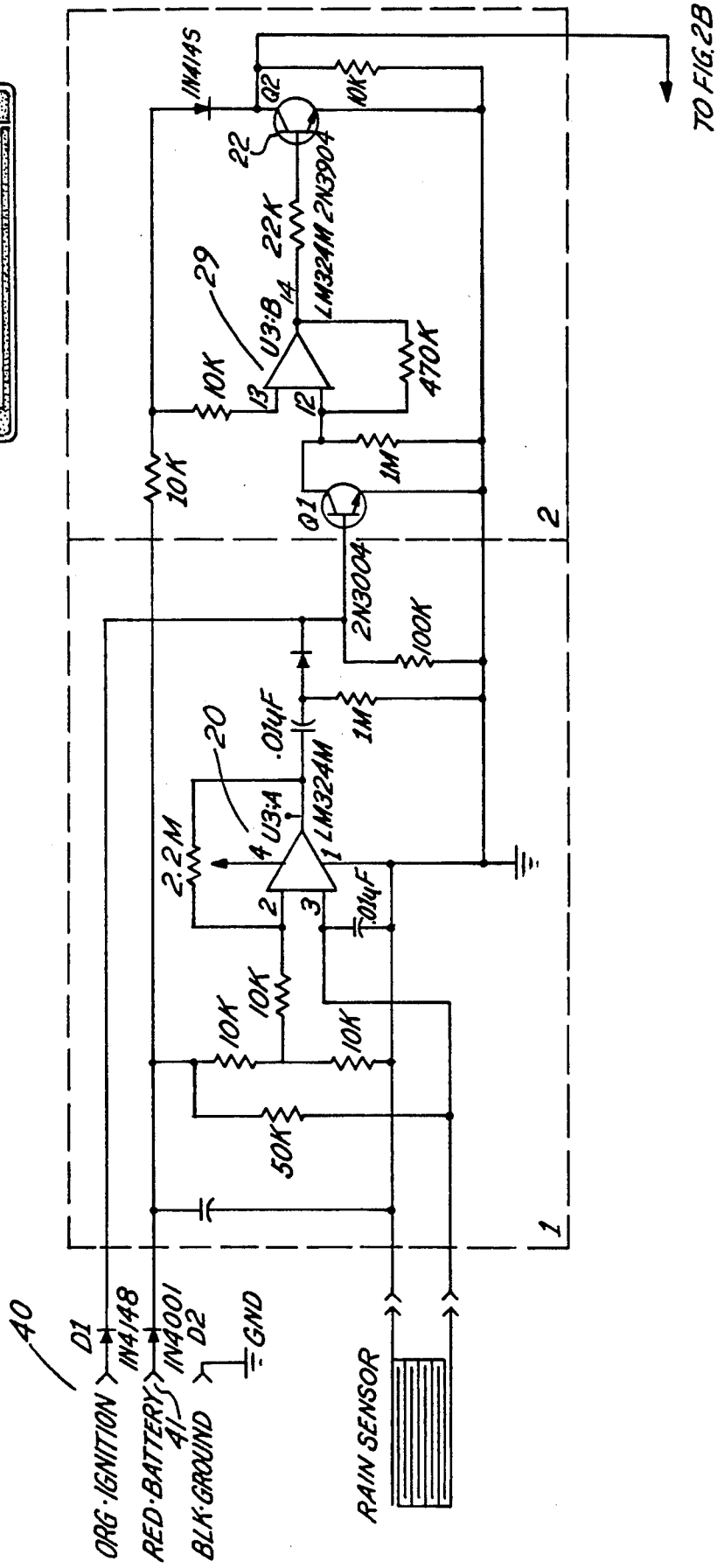
Figure 3:
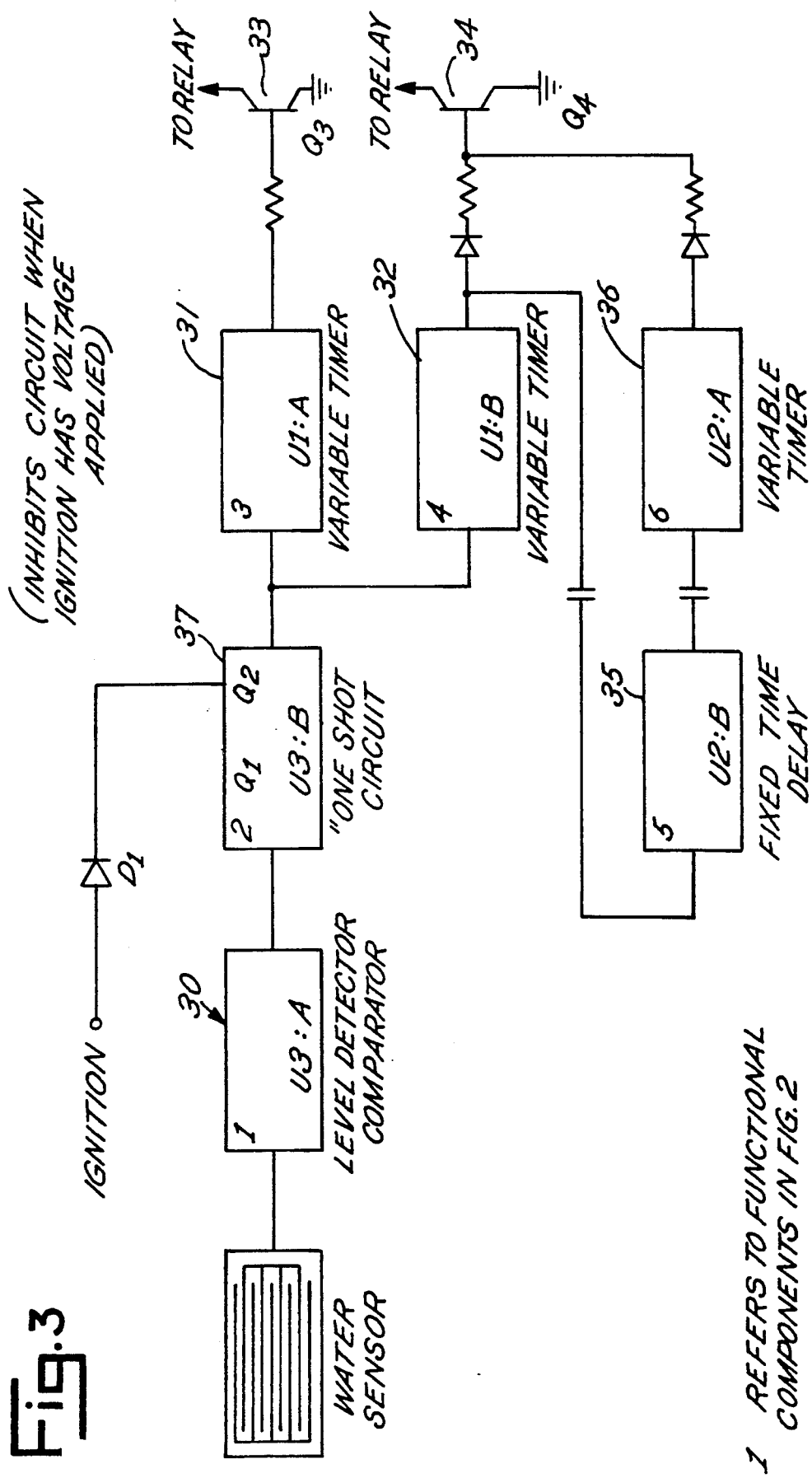
FIG. 3 is a block diagram identifying the key functional components of the present invention.

In FIG. 2A, FIG. 2B and FIG. 3, when moisture makes contact with the moisture sensor, the level detection comparator (U3:A) 20,30 detects a falling voltage compared to a reference voltage. This change in the input voltage to U3:A 20,30 causes a change in the output voltage of U3:A 20,30. The change in the output voltage of U3:A 20,30 causes the base voltage of transistor $Q_1$ 21 to increase. This, in turn, increases the output voltage of U3:B 27,39 and thus turns on transistor $Q_2$ 22.

Transistor $Q_2$ 22 turns on two timers, U1:A 23,31 and U1:B 24,32. Timer U1:A 23,31 can be adjusted for a specific period of time to drive an output device via a transistor $Q_3$ 25,33. This output device can be any single closure device such as two windows on a two-door motor vehicle or four windows on a four-door motor vehicle. Another example of an output device driven by transistor $Q_3$ 25,33 is a pager (or beeper) which can advise a person that moisture, such as rain, has activated the sensor on the motor vehicle. This would be of particular interest for a motor vehicle equipped with a manually operated convertible top or a manually operated moon roof or sun roof. A third example of an output device driven by transistor $Q_3$ 25,33 is a convertible top with a relatively short closure time. In each of these examples, the variable timer U1:A 23,31 can be set to such a period of time necessary to close the external opening equal to the time necessary to close the same opening manually. Thus, no excess power beyond that needed to close the opening is sent to the motor.

Transistor $Q_2$ 22 also turns on U1:B 24,32 which can be adjusted for a specific period of time to drive an output device via a transistor $Q_4$ 26,34. When U1:B 24,32 has timed out, that is, completed its cycle, a delay is activated for a specific period of time. This delay is set by fixed timer U2:B 27,35. When U2:B 27,35 has timed out, it fires a second variable timer, U2:A 28,36, which can be adjusted for a specific period of time to drive an output device via a transistor $Q_4$ 26,34. This output device can be a double closure device such as a sun roof or a moon roof equipped with a safety feature that requires two steps to close the roof. Timer U1:B 24,32 would be set to close the sun roof or moon roof to the first position via transistor $Q_4$ 26,34 and timer U2:A 28,36 would be set to close the sun roof or moon roof to the final position. Another example of an output device driven by transistor $Q_4$ 26,34 is a convertible top with an unusually long closure period that exceeds the maximum time of a single timer.

U3:B 29,37, which drives transistor $Q_2$ 22 and thus the timers U1:A 23,31, U1:B 24,32 and U2:A 28,36, can only be triggered once by U3:A 20,30 until the system is reset. If voltage is applied to the base of transistor $Q_1$ 21, U3:B 29,37 is reset and the output voltage of U3:B can increase to drive transistor $Q_2$ 22. In practice, this refers to turning on the ignition 40 of the motor vehicle to reset the system. It cannot operate, however, until the ignition is turned off.

It is critical that this system does not operate when the motor vehicle is in the operational mode, i.e. the ignition is on. By applying a constant voltage to transistor $Q_2$ 22 from the battery 41, a similar voltage applied to the base of transistor $Q_1$ 21 from the ignition will prevent transistor $Q_2$ 22 from driving any of the timers.

If the sensor detects moisture and activates the entire system and thus closes the appropriate external opening, the system will not attempt to close these openings unless U3:B 29,37 is reset. Consequently, if after the system has completed a cycle and the moisture on the sensor has evaporated, one might expect the system to be in a mode to repeat the process if moisture reappears. This, however, will not occur without resetting U3:B 29,37 as described above.

When the output voltage of U3:B 29,39 increases to drive transistor $Q_2$ 22, both timers U1:A 23,31 and U1:B 24,32 are turned on simultaneously. If an output device is driven by each of these timers, both output devices will operate simultaneously. Thus, if moisture is detected by a sensor on a motor vehicle, both the windows and a sun roof, moon roof or convertible top will close simultaneously.

The invention has been described in detail with particular reference to an illustrative preferred embodiment thereof, but it will be understood that variations and modifications can be effected within the spirit and scope of the invention as described hereinabove and as defined in the appended claims.

We claim as our invention:

1. A system for protecting the interior of a motor vehicle that is responsive to moisture in excess of a predetermined level, comprising:
    (a) detecting means for sensing moisture, having an output and being capable of generating a first signal at its output in response to the sensed moisture;
    (b) first means for timing, having an input and an output, the input coupled to the output of the detecting means and adapted to receive the first signal, the first means for timing capable of generating a second signal at its output in response to the first signal;
    (c) first means for switching power, having an input and an output, the input coupled to the output of the first means for timing and adapted to receive the second signal;
    whereby the second signal is adapted to be coupled to the input of a pager or beeper so as to notify a person to close a manually operated closure.

2. A system for protecting the interior of a vehicle that is responsive to moisture in excess of a predetermined level comprising:
    (a) detecting means for sensing moisture, having an output and being capable of generating a first signal at its output in response to the sensed moisture;
    (b) first means for timing, having an input and an output, the input coupled to the output of the detecting means and adapted to receive the first signal, the first means for timing capable of generating a second signal at its output in response to the first signal;
    (c) first means for switching power, having an input and an output, the input coupled to the output of the first means for timing and adapted to receive the second signal, the first means for switching power capable of generating a third signal at its output in response to the second signal;

(d) second means for timing, having an input and an output, the input coupled to the output of the detecting means and adapted to receive the first signal, the second means for timing capable of generating a fourth signal at its output in response to the first signal;

(e) second means for switching power, having a first input, a second input, and an output, the first input coupled to the output of the second means for timing and adapted to receive the fourth signal, the second means for switching power capable of generating a fifth signal at its output in response to the fourth signal;

(f) third means for timing, having an input and an output, the input coupled to the second means for timing and adapted to receive the fourth signal, the third means for timing capable of generating a sixth signal at its output in response to the fourth signal;

(g) fourth means for timing, having an input and an output, the input coupled to the third means for timing and adapted to receive the sixth signal, the fourth means for timing capable of generating a seventh signal at its output in response to the sixth signal, the seventh signal being coupled to the second input of the second means for switching power, the second means for switching power capable of generating an eight signal at its output in response to the seventh signal; and (h) means for deactivating the system responsive to the completion of a cycle of the system.

3. The system of claim 2, wherein the detecting means for sensing moisture senses the moisture in excess of a predetermined level, said predetermined level can be set as low as a single drop of rain water.

4. The system of claim 2 wherein the third and eight signals are adapted to be coupled to several motors adapted to operate simultaneously as many closures that protect the interior.

5. The system of claim 2, wherein the system is suppressed when the ignition of the vehicle in ON.

6. The system of claim 2, wherein the first means for timing must be reset by receiving a separate signal from the ignition before said first means for switching power can be responsive to said second signal.

7. The system of claim 2 wherein the second and seventh signals are variable and to be coupled to the inputs of motors that are adapted to operate closures such that power to said motors is discontinued immediately after the respective closures have closed completely and thus no excess power is directed to said motors.

* * * * *